United States Patent
Solberg, Jr. et al.

[11] Patent Number: 5,902,964
[45] Date of Patent: *May 11, 1999

[54] MEASUREMENT OF MASS USING SIMPLE HARMONIC MOTION WITH ACTIVE SPRING AND ACTIVE DAMPING

[75] Inventors: Ruell F. Solberg, Jr.; H. Stanley Silvus, both of San Antonio, Tex.

[73] Assignee: Southwest Research Institute, San Antonio, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/915,867

[22] Filed: Aug. 21, 1997

Related U.S. Application Data

[60] Provisional application No. 60/024,335, Aug. 22, 1996.

[51] Int. Cl.$^6$ .................................................. G01G 3/14
[52] U.S. Cl. ................ 177/1; 177/210 EM; 177/210 FP; 177/25.11; 73/580
[58] Field of Search ................................. 73/DIG. 1, 580; 177/210 EM, 210 FP, 25.11, 25.13, 25.14, 1

[56] References Cited

U.S. PATENT DOCUMENTS

| | | | |
|---|---|---|---|
| 2,694,310 | 11/1954 | Pounds | 73/67 |
| 3,323,370 | 6/1967 | Green et al. | 73/432 |
| 3,492,858 | 2/1970 | Heflinger et al. | 73/67.2 |
| 3,555,886 | 1/1971 | Thornton | 73/67.2 |
| 3,565,193 | 2/1971 | Wirth | 177/1 |
| 3,926,271 | 12/1975 | Patashnick | 177/210 |
| 3,988,933 | 11/1976 | Fletcher et al. | 73/432 R |
| 4,158,395 | 6/1979 | Brown | 177/210 |
| 4,161,876 | 7/1979 | Carpenter | 73/580 |
| 4,249,411 | 2/1981 | Pearson | 73/12 |
| 4,274,501 | 6/1981 | Gallo et al. | 177/210 FP |
| 4,391,338 | 7/1983 | Patashnick et al. | 177/210 FP |
| 4,405,024 | 9/1983 | Fraval et al. | 177/200 |
| 4,429,574 | 2/1984 | Barry et al. | 73/580 |
| 4,685,326 | 8/1987 | Peterson | 73/580 |
| 4,696,181 | 9/1987 | Rupprecht et al. | 73/580 |
| 4,838,371 | 6/1989 | Rupprecht et al. | 177/210 FP |
| 5,442,960 | 8/1995 | Solberg, Jr. | 73/580 |

*Primary Examiner*—Randy W. Gibson
*Attorney, Agent, or Firm*—Baker & Botts, L.L.P.

[57] ABSTRACT

A method for measuring the masses of objects in any gravity environment, including microgravity or zero gravity. An object is placed on or attached to a platform that is movable back and forth along a single axis of motion. An actuator is used to oscillate the platform and is controlled to provide a variable spring force. Instantaneous displacement values are obtained and used to calculate the period of oscillation. Values representing the period, the tare mass of the platform, and the spring constant are then used to calculate the mass of the object. The method may use active damping, and may be varied so that the oscillations are angular rather than linear.

33 Claims, 2 Drawing Sheets

MEASUREMENT OF MASS USING SIMPLE HARMONIC MOTION WITH ACTIVE SPRING AND ACTIVE DAMPING

RELATED PATENT APPLICATIONS

This application claims priority under 35 U.S.C. § 119(c)(1) of provisional application number 60/024,335 filed Aug. 22, 1996.

TECHNICAL FIELD OF THE INVENTION

This invention generally pertains to devices which measure the masses of objects. It more particularly relates to a device and method which can also be used in environments with gravity different from that on planet Earth.

BACKGROUND OF THE INVENTION

In terms of classical physics, "mass" is a measure of inertia, i.e., it is a measure of the opposition that a body offers to any attempts at changing its state of motion. The greater the mass of a body, the lower its acceleration under the action of an applied force. On Earth, the mass of a body can be determined by measuring its weight, where weight is the gravitational force acting on the body. If the acceleration due to Earth's gravity, a, and the weight, F, are known, the mass, m, can be determined from Newton's second law of motion, which in equation form is F=ma.

A problem with conventional methods of obtaining mass by measuring weight for some conditions is that they require gravity, that is, a condition of not being "weightless". In environments where the acceleration of gravity is apparently zero, such as in a spacecraft orbiting Earth, where it is zero, such as deep in intergalactic space, or where it is not the standard value, such as on the moon, some means for measuring mass other than the typical, conventional methods of measuring weight on Earth must be used. In classical physics, mass is defined such that a given body has a value that remains constant under all of the conditions described above.

Equipment is in use today for measuring mass under microgravity conditions, such as during space travel. One type of such equipment is a simple spring-mass system, wherein the object whose mass is to be measured is oscillated. The relationship between the mass of the object and the period of oscillation is used to obtain the mass value, using the principle that for a spring-mass oscillating system, the square of the period is related to the mass and the spring constant of the spring. A second type of such equipment imparts angular motion to a fluid by a rotary impeller in a housing. The rotation of the fluid creates centrifugal forces and fluid pressures. The centrifugal pressure is measured with a pressure transducer and converted to a mass value.

A third type of instrument for measuring mass is through utilizing principles of angular simple harmonic motion. The object whose mass is to be measured is placed on a platform having torque restoring means. The platform is rotated from an equilibrium position and released, such that it undergoes angular simple harmonic motion. The period of oscillation is measured and used to calculate the mass of the object on the platform. A system of this type is described in U.S. Pat. No. 5,442,960, entitled "Measurement of Mass Using Angular Simple Harmonic Motion", assigned to Southwest Research Institute.

A problem with existing systems for measuring mass under microgravity conditions is that they require calibration using a large number of known masses over the measurement range. For example, reasonable approximations can be obtained with the spring-mass system if it is assumed to be a single degree of freedom oscillator and an ideal linear relationship exists between the square of the period of oscillation and the mass of the object. However, over even small mass ranges of the equipment, that relationship varies from the ideal sufficiently that errors prevent achieving consistently high accuracy. So, the variations from the ideal can be reduced by an increase of the number of calibration masses.

Similar problems exist for the rotary impeller system in that there are variations about the expected linear relationship between mass and pressure. Therefore, the rotary impeller system requires calibration for a set of masses over closely spaced intervals. In addition, calibration over the full mass range is required for accurate results. Recalibration is also required under some conditions. This consumes time, promotes errors, and requires availability of calibration masses. Budgeting of time and weight are important considerations for spaceflight missions.

The rotary impeller system also has the disadvantage of not being adaptable to measuring items other than liquids. It particularly is not well suited for measuring the masses of solid items, especially if they are large.

Also, the physical sizes of these types of systems for use in microgravity are large. Obviously, that is a negative factor for many situations where mass must be measured. One spring-mass system designed to operate in microgravity also requires significant additional equipment for it to operate in a gravity environment as on Earth. Operation on Earth is very desirable for checkout, testing, and verification.

The rotary impeller system is complex to operate and requires lengthy time interactions by the operator. The cycle time to perform a mass measurement is long. It is difficult to remove all of a sample after a measurement, which will cause an error for the following sample measurement. It also has reduced accuracy for smaller samples. It has poor maintainability, repairability, and reliability.

SUMMARY OF THE INVENTION

One aspect of the invention is a method for measuring the masses of objects in any gravity environment, including microgravity or zero gravity. An object is placed on or attached to a platform that is movable back and forth along a single axis of motion. An actuator is used to oscillate the platform and is controlled to provide a known spring force. Instantaneous displacement values are obtained and used to calculate the period of oscillation. Values representing the period, the tare mass of the platform, and the spring constant are then used to calculate the mass of the object. Various embodiments of the invention may use active damping, and may use angular oscillations rather than linear.

DETAILED DESCRIPTION OF THE INVENTION

Linear Simple Harmonic Motion

Figure 1:
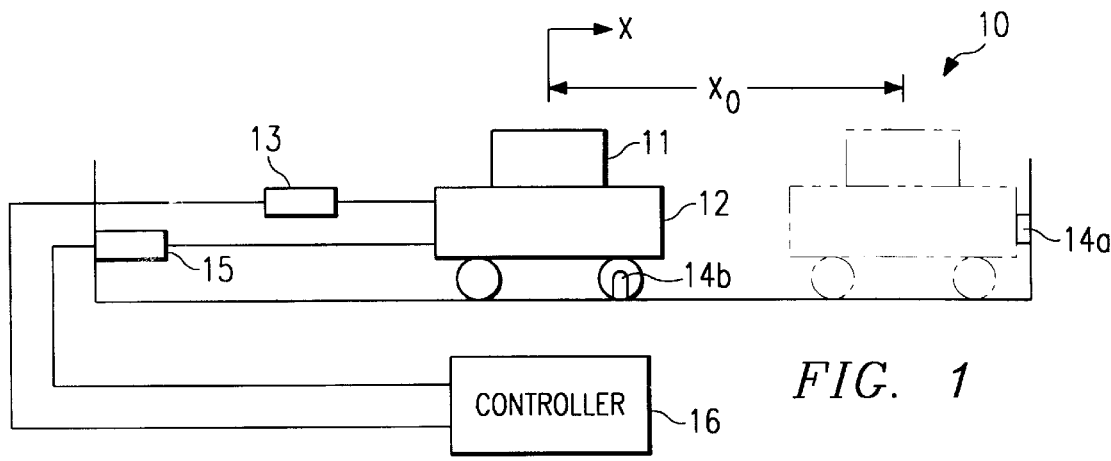
FIG. 1 illustrates a system for determining the mass of an object using linear simple harmonic motion with an active spring.
Figure 2:
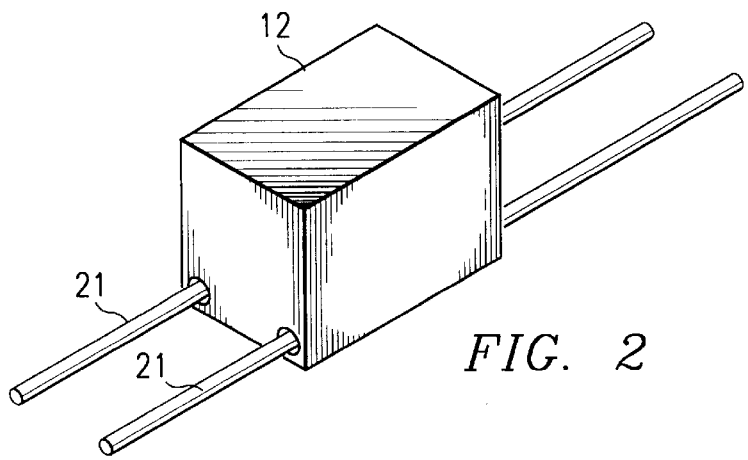
FIG. 2 illustrates the system of FIG. 1 in perspective view to show how the platform is guided along a single axis of motion.
Figure 3:
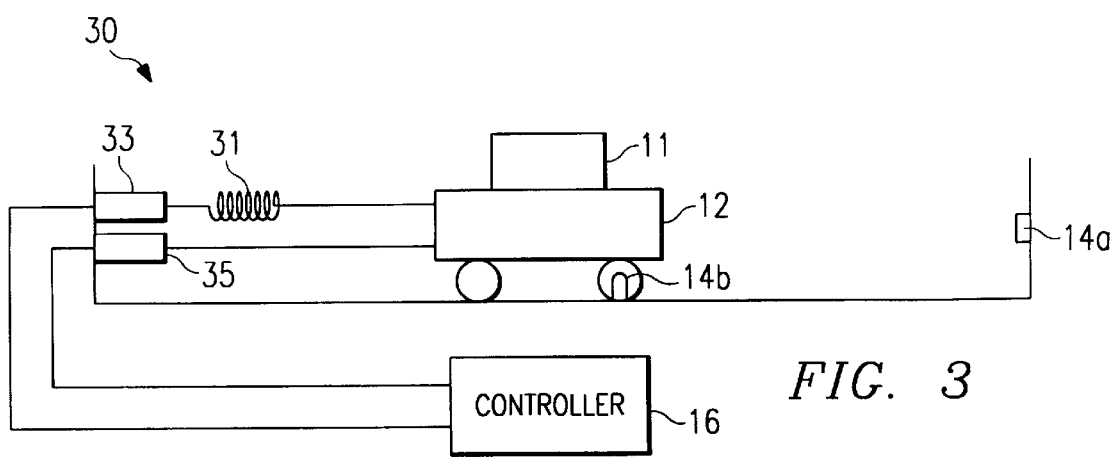
FIG. 3 illustrates a system for determining the mass of an object using linear simple harmonic motion with active damping.

FIGS. 1–3 are directed to systems that determine mass by measuring the period of oscillation of linear simple harmonic motion. These systems may use an active spring or active damping, or a combination of both, to achieve idealized, classical spring-mass oscillation characteristics.

FIG. 1 illustrates a system 10 for determining the mass of an object 11 using linear simple harmonic motion with an active spring 13. The system 10 has a platform 12 which undergoes single-degree-of-freedom vibration.

Object 11 is placed on platform 12. Object 11 is mounted on platform 12 in a manner such that object 11 is positioned properly and will not come loose from platform 12 when it moves. Straps, clamps, tracks, or any variety of means (not shown) can be used for this purpose, and the preferred type will depend upon the shape, size, and other external characteristics of object 11. In microgravity conditions, object 11 is attached in a manner that prevents it from floating away. A perforated rubber cover works well when object 11 has an irregular shape.

Active spring 13 is an electronically controlled actuator, which is rigidly coupled between the platform and a fixed location along the axis of motion. An example of a suitable actuator is an electromagnetic actuator, which comprises a coil and a core. A magnetized core will provide both compression and tension capability or a two-coil arrangement can be used. Other types of motors or actuators, such as electrohydraulic actuators, can be used, so long as they are capable of providing an oscillating motion with sufficient response time to change the applied spring force.

As explained below, the use of an active spring 13 permits the value of the spring constant to be controlled and avoids problems associated with the nonlinearity of the spring constant of a mechanical spring. In other words, active spring 13 can be controlled so as to perform as an ideal spring.

A latch and release mechanism 14a is used to hold and release platform 12 at an offset position. This offset position is indicated in FIG. 1 as being a distance $x_o$ from the equilibrium position of platform 12. When platform 12 is released from the offset position, oscillation will occur. A locking or caging device 14b can be used to hold the platform 12 in its equilibrium position when system 10 is not in use.

In general, platform 12 may be any shape or size, with a common characteristic being that it provides a means to provide an oscillating motion for object 11. To this end, platform 12 is guided or constrained to move along one axis only.

FIG. 2 illustrates the axis of motion of platform 12. In FIG. 2, platform 12 moves along rails 21, but a single axis of motion could alternatively be achieved with air or magnetic (levitation) bearings, or types of rails or guides with bearings or bushings, or by other means. For operation in other than microgravity or zero gravity conditions, leveling screws, leveling pads, or other means can be used to adjust system 10 so that it is level along the axis of motion of platform 12. The other directions are not required to be level, and system 10 is not sensitive to extraneous forces, torques, or accelerations that are in directions different from that of the oscillation.

Displacement sensor 15 measures the instantaneous displacement, x, of platform 12 from its equilibrium position. An example of a suitable displacement sensor is a linear variable differential transformer (LVDT), which has the desirable characteristics of being linear, repeatable, and frictionless. Other types of displacement sensors could be used, such as laser sensors. It is also possible to derive displacement from a velocity sensor, or from an accelerometer, using controller 16 to integrate instantaneous velocity or acceleration values. In all cases, system 10 uses a means for determining displacement, regardless of whether displacement, velocity, or acceleration is being measured.

Controller 16 monitors and controls the operation of system 10, as well as receives data from sensor 15. Controller 16 may include memory and a programmable processor for storing and executing programming that processes data and calculates and displays the mass of the object being measured.

More specifically, as explained below, controller 16 monitors instantaneous displacement, x, using data acquired from sensor 15. Using Equation (2) set out below, controller 16 is programmed to calculate an active spring force, $F_S$, from values of x and k. Controller 16 controls the force applied by active spring 13 by controlling the spring constant, k, of active spring 13. For example, k can be maintained at a constant value for purposes of calculating mass in accordance with Equation (12) below. Controller 16 can be programmed to allow either a setting of the spring constant or automatic adjustments. Using measured values of displacement, controller 16 can be programmed to calculate the spring constant. Likewise, controller 16 can be programmed to calculate the tare mass using measured values.

Controller 16 also uses values of x to determine the period of oscillation, T. Controller 16 can be programmed to determine crossing of the equilibrium position of platform 12 when it is oscillating and to measure the time elapsed between crossings. For this purpose, controller 16 includes a timer, and measures and stores values of T. Controller 16 can also provide statistical analysis of mass measurements or other data.

The equation of motion describing system 10 may be most simply considered in the absence of damping and without object 11 on platform 12. Considering only the tare mass, $m_t$, of platform 12 and its associated parts, the undamped force on the tare mass by spring 13 can be expressed in terms of Newton's second law of motion as $$F = m_t \frac{d^2x}{dt^2} \tag{1}$$

where F is the force on the tare mass and $d^2x/dt^2$ is the acceleration on the tare mass caused by the force.

The restoring force on the tare mass caused by active spring 13 is $$F_S = -kx. \tag{2}$$

The spring force is in an opposite direction to the undamped force, as reflected in Equation (2) by the negative sign.

If the only external force on the tare mass were from spring 13, then $$-kx = m_t \frac{d^2x}{dt^2}. \tag{3}$$

Equation (3) can be rearranged to $$m_t \frac{d^2x}{dt^2} + kx = 0. \tag{4}$$

A solution to Equation (4), with the initial conditions set out above (a displacement with zero velocity) is $$x(t) = x_0 \cos \omega t \tag{5}$$

where $x_0$ is the offset from equilibrium, $\omega$ is the natural circular frequency, and t is time.

The natural circular frequency may be expressed as $$\omega = \sqrt{\frac{k}{m_t}} \tag{6}$$

and the natural frequency of oscillation is $$f = \frac{\omega}{2\pi} = \frac{1}{2\pi}\sqrt{\frac{k}{m_t}}. \tag{7}$$

Rearranging Equation (7) to solve for the mass of platform 12, $$m_t = \frac{k}{(2\pi f)^2}. \tag{8}$$

If the period of oscillation, T, is substituted for the reciprocal of the natural frequency, then $$m_t = k\left(\frac{T}{2\pi}\right)^2. \tag{9}$$

The above principles can be restated with the object 11 of unknown mass, m, mounted on platform 12. The total mass of the object 11 plus the tare mass may be expressed as $m+m_t$. In this situation, for undamped oscillation, the differential equation of motion (Equation (4)) becomes $$(m+m_t)\frac{d^2x}{dt^2} + kx = 0. \tag{10}$$

Now, $$f = \frac{1}{2\pi}\sqrt{\frac{k}{m+m_t}} \tag{11}$$

and $$m = k\left(\frac{T}{2\pi}\right)^2 - m_t. \tag{12}$$

This demonstrates that the mass of object 11 can be measured by attaching it to platform 12, displacing platform 12, allowing it to oscillate, and measuring the period of oscillation. The spring constant and tare mass can be determined by calibration. Specifically, the tare mass can be determined by performing measurements with platform 12 empty or with an object 11 of known mass, such that m in Equation (12) is zero or is a known value.

With damping applied to platform 12, the same concepts as discussed above apply. The damping force is $$F_d = -c\frac{dx}{dt} \tag{13}$$

where c is the damping constant.

The differential equation of motion for an unknown object on a damped oscillating platform 12 is $$(m+m_t)\frac{d^2x}{dt^2} + c\frac{dx}{dt} + kx = 0. \tag{14}$$

A general solution of Equation (14) is $$x(t) = Ae^{st} \tag{15}$$

where A and s are constants.

Substituting Equation (15) into Equation (14) and rearranging yields $$Ae^{st}[(m+m_t)s^2 + cs + k] = 0. \tag{16}$$

The characteristic equation (the expression in brackets) must equal zero because $Ae^{st}$ cannot be zero. Then, $$(m+m_t)s^2 + cs + k = 0. \tag{17}$$

Rearranging Equation (17), $$s^2 + \left(\frac{c}{m+m_t}\right)s + \frac{k}{m+m_t} = 0. \tag{18}$$

The roots of this quadratic equation are $$s = -\frac{c}{2(m+m_t)} \pm \sqrt{\left[\frac{c}{2(m+m_t)}\right]^2 - \frac{k}{m+m_t}}. \tag{19}$$

Oscillating motion can occur only under the condition of less than critical damping, which is for $$\left[\frac{c}{2(m+m_t)}\right]^2 < \frac{k}{m+m_t}. \tag{20}$$

The natural circular frequency is defined typically as being the second term of Equation (19). Therefore, the damped natural circular frequency for less than critically damped systems is $$\omega_d = \sqrt{\frac{k}{m+m_t} - \left[\frac{c}{2(m+m_t)}\right]^2}. \tag{21}$$

The damped period of oscillation is $$T_d = \frac{2\pi}{\sqrt{\frac{k}{m+m_t} - \frac{c^2}{4(m+m_t)^2}}}. \tag{22}$$

This shows that the natural frequency decreases and the period of oscillation increases when damping is present. An expression for m can be obtained from Equation (22) as was done for the earlier simpler cases, but it is more complex and is not set out herein.

FIG. 3 illustrates a system 30 for determining mass using linear simple harmonic motion with active damping and a mechanical spring 31. Active damping system 30 is similar to active spring system 10, except that mechanical spring 31 is combined with an actuator 33 that provides an active damping force, $F_D$. Mechanical spring 31 provides a spring force, $F_S$, and has a spring constant, k.

Velocity sensor 35 measures the instantaneous velocity, V=dx/dt, of platform 12. Examples of suitable velocity sensors are electromagnetic moving coil and moving magnet sensors and laser doppler sensors.

Controller 16 is programmed to calculate the damping force at any value of v for a given damping constant, using Equation (13). It can then control actuator 33 to add to, subtract from, or simply compensate for the natural system damping. In the latter case, controller 16 is calibrated with a damping constant obtained by operating system 30 without any active damping. Controller 16 then adjusts actuator 33 so that it provides an "anti-damping" force that cancels the natural damping of system 30. This permits system 30 to behave as an ideal, undamped oscillator.

Controller 16 can be programmed to maintain a constant damping constant or to automatically adjust the damping constant to meet other desired conditions of operation.

As an alternative to using velocity sensor 35, a displacement sensor could be used with controller 16 programmed to differentiate displacement over time. Or, an accelerometer could be attached to platform 12 with controller 16 programmed to integrate acceleration. In all cases, system 30 uses a means for determining velocity, regardless of whether displacement, velocity, or acceleration is being measured.

Referring to both FIGS. 1 and 3, it is possible to use an actuator 13 or 33 to provide both an active spring and active damping. In this case, there would be no need for mechanical spring 31. This system could be similar to system 10, but with controller 16 programmed for both an active spring and active damping. The same sensor can be used for determining displacement (for an active spring) and velocity (for active damping). As explained above, these parameters can be obtained by measuring displacement, velocity, or acceleration, with appropriate calculations by controller 16. For example, the LVDT sensor 15 of FIG. 1 can be used with controller 16 programmed to differentiate displacement. Alternatively, separate displacement and velocity sensors can be used. Controller 16 would calculate both a desired spring force and a desired damping force. These forces are 90 degrees out of phase, and controller 16 is programmed to combine them to obtain a resultant force to be applied by actuator 33. The force applied to platform 12 will be the sum of the forces for the active spring and the active damping, i.e., $$F = F_s + F_d = -kx - c\frac{dx}{dt}. \quad (23)$$

Regardless of whether an active spring or active damping or both are used, controller 16 can be further programmed to perform empty platform measurements before measuring unknown objects or at certain time intervals. It can then verify the spring and damping characteristics and the tare mass, as desired.

Special spring and damping characteristics other than linear can be provided by other programming to control the active spring and active damping. A feature of the invention is that active spring or active damping can be used to incorporate safety features. For example, if the movement from the equilibrium position exceeds normal limits, non-linear or large spring constant or constant force characteristics can be directed by controller 16 and applied to platform 12.

Angular Simple Harmonic Motion

Figure 4:
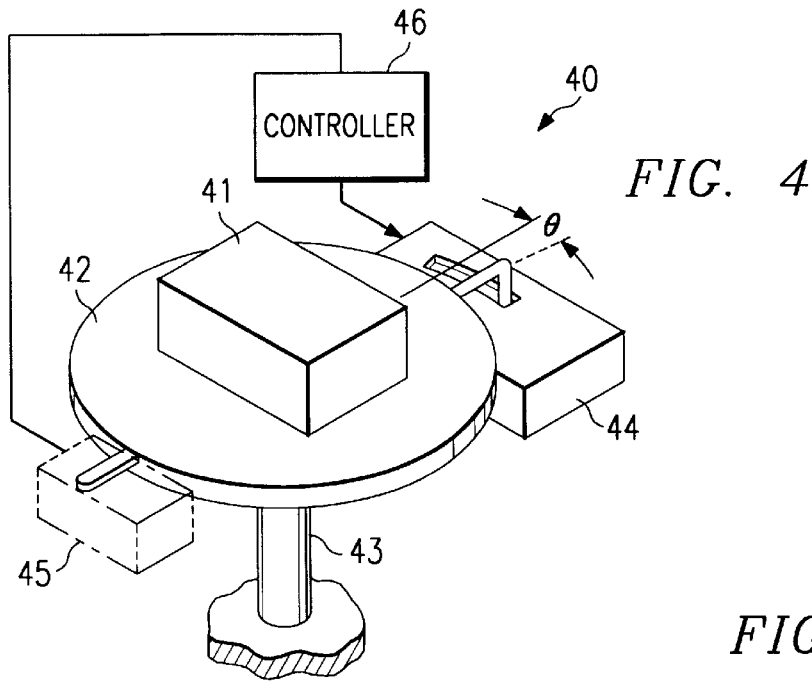
FIG. 4 illustrates a system for determining the mass of an object using angular simple harmonic motion with an active spring.
Figure 5:
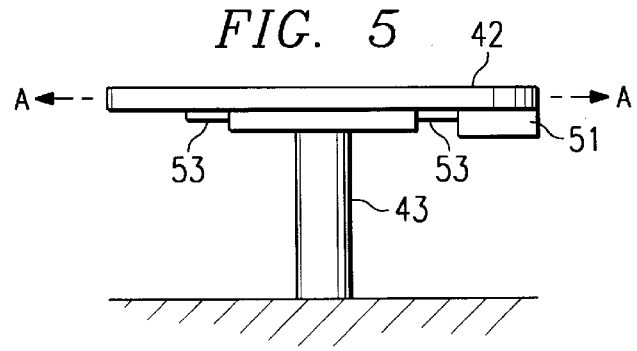
FIG. 5 illustrates the system of FIG. 4, with an actuator for providing radial displacement.
Figure 6:
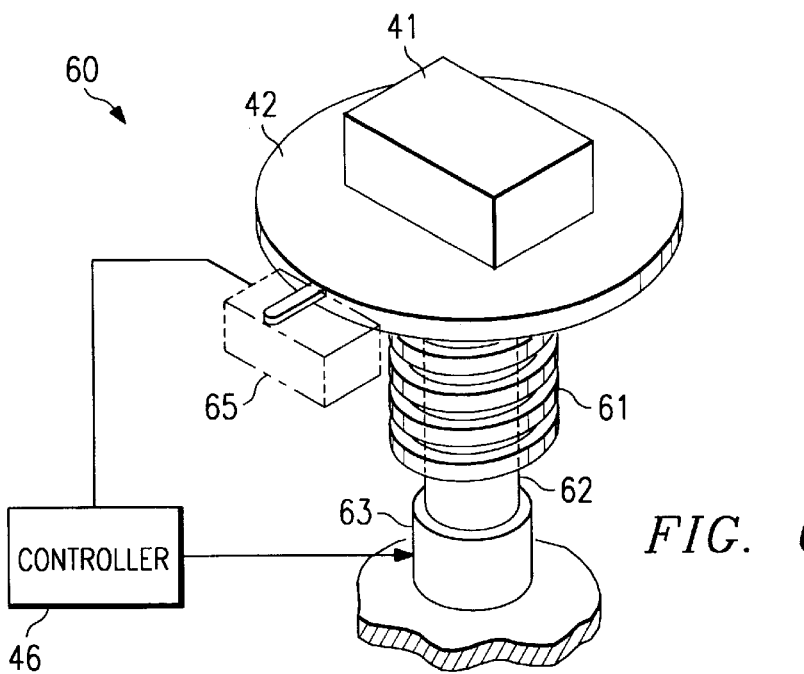
FIG. 6 illustrates a system for determining the mass of an object using angular simple harmonic motion with active damping.

FIGS. 4–6 are directed to systems that determine mass by measuring the period of oscillation of angular simple harmonic motion. In a manner analogous to the linear systems described above, these systems may use an active spring or active damping or a combination of both to achieve ideal, classical, spring-mass oscillation characteristics.

FIG. 4 illustrates a system 40 for measuring mass using angular simple harmonic motion with an active spring. A system similar to system 40 but without an active spring is described in U.S. Pat. No. 5,442,960, referenced in the Background, and incorporated herein by reference.

Object 41 whose mass is to be measured is placed on platform 42. Platform 42 is attached to one end of an active torsional spring 43. The other end of active spring 43 is fixed. Active spring 43 may be any electronically controlled torque restoring means. In the example of FIG. 4, active spring 43 is implemented with a torque actuator, but in other embodiments, the active spring 43 could be comprised of a rotatable shaft to which platform 42 is mounted and a linear actuator that applies force to rotate the shaft.

A position sensor 45 measures the instantaneous angular displacement, θ, of platform 12. In the example of FIG. 4, position sensor 45 detects the displacement of a protrusion on platform 42 from a reference point.

In operation, actuator 44 rotates platform 42 from its equilibrium position to an angular offset position of a given angular displacement. If platform 42 is released from this position, it oscillates with angular simple harmonic motion.

As discussed in U.S. Pat. No. 5,442,960, controller 46 is programmed to calculate the mass of object 11 from the following equation $$m = \frac{1}{r^2}\left[k\left(\frac{T}{2\pi}\right)^2 - I_t\right], \quad (24)$$

where m is the mass of object 41, r is the radius of gyration of object 41, k is the torsional spring constant of the active spring, T is the period of oscillation, and $I_t$ is the tare mass moment of inertia of platform 42 and its associated oscillating parts.

There are two approaches to this calculation, whose use depends on whether the radius of gyration of object 41 is known. One approach involves radial displacement of object 41 from the axis of rotation of platform 42. FIG. 5 illustrates an actuator 51 for providing this radial displacement along a radial axis, A, of platform 42. Specifically, actuator 51 can cause the radial displacement by elongating and compressing a telescoping rail 53.

U.S. Pat. No. 5,442,960, referenced in the Background and incorporated by reference herein, mathematically develops an equation for the radius of gyration, r, which can be used with Equation (24) when oscillating platform 42 is displaced radially, Δr. Then, measurements are made at each displacement and controller 46 uses Equation (24) and the following equation to calculate mass $$r^2 = \frac{\Delta r^2 \left[k\left(\frac{T}{2\pi}\right)^2 - I_t\right]}{\frac{k}{(2\pi)^2}(T_{\Delta r}^2 - T^2) + I_t - I_{t\Delta r}} \quad (25)$$

where $T_{\Delta r}$ and $I_{t\Delta r}$ are the period and the tare mass moment of inertia, respectively, when platform 42 is at the radially displaced position.

Controller 46 is programmed to perform in a manner analogous to controller 16 described above, except that calculations are appropriate for angular simple harmonic motion rather than linear motion. More specifically, controller 46 is programmed to measure the period of oscillation and to calculate mass in accordance with Equations (24) and (25).

Controller 46 is further programmed to control active spring 43. When platform 42 is attached to a torsional spring that is fixed at its other end, the restoring torque is proportional to the angular displacement and the torsional spring constant. Thus, $$\tau = -k\theta. \qquad (26)$$

Active spring 43 can simulate the torsional spring by using controller 46 to monitor the instantaneous angular displacement of platform 42 from its equilibrium position and applying a calculated restoring torque to platform 42 as a function of the displacement.

FIG. 6 illustrates a system 60 for measuring the mass of an object using angular simple harmonic motion with active damping. Active damping system 60 is similar to active spring system 40, except that a mechanical spring 61 is wound around a rigid shaft 62. It is combined with actuator 63 that provides an active damping torque, $\tau_D$. Mechanical spring 61 provides the spring torque, $\tau_S$, and has a spring constant k. Actuator 63 can be implemented with a coil magnetic actuator.

Velocity sensor 65 measures the instantaneous angular velocity of platform 42. Velocity sensor 65 can be implemented with an angular velocity sensor or with a linear velocity sensor with controller 46 being programmed to convert linear values to angular.

For active damping, controller 46 is programmed to calculate the damping torque at any value of angular velocity for a given damping constant. It can then control actuator 63 to add to, subtract from, or simply compensate for the natural system damping. In the latter case, controller 46 is calibrated with a damping constant obtained by operating system 60 without any active damping. Controller 46 then adjusts actuator 63 so that it provides an "anti-damping" torque that cancels the natural damping of system 60. This permits system 60 to behave as an ideal, undamped oscillator.

As an alternative to using velocity sensor 65, a displacement sensor can be used with controller 46 programmed to differentiate displacement over time. Or, an accelerometer can be attached to platform 42 with controller 46 programmed to integrate acceleration. In all cases, system 60 uses a means for determining angular velocity, regardless of whether displacement, velocity, or acceleration is being measured.

It is possible to use actuator 63 to provide both an active spring and active damping. In this case, there would be no need for mechanical spring 61. This system could be similar to system 40, but with controller 46 programmed for both an active spring and active damping. The same sensor can be used for determining displacement (for an active spring) and velocity (for active damping). As explained above, these parameters can be obtained by measuring displacement, velocity, or acceleration, with appropriate calculations by controller 46.

Alternatively, separate displacement and velocity sensors can be used. Controller 46 would calculate both a desired spring torque and a desired damping torque. These torques are 90 degrees out of phase, and controller 46 is programmed to combine them to obtain a resultant torque to be applied by actuator 63. The torque applied to platform 42 will be the sum of the torques of the active spring and the active damper, i.e., $$\tau = \tau_s + \tau_d = -k\theta - c\frac{d\theta}{dt}. \qquad (27)$$

Derivations similar to those used for the linear damped system of FIG. 3 provide the period of damped simple harmonic motion. Mass moment of inertia of the unknown object and the tare mass moment of inertia replace the object mass and the tare mass in Equation (22), such that $$T_d = \frac{2\pi}{\sqrt{\dfrac{k}{I+I_t} - \dfrac{c^2}{4(I+I_t)^2}}}. \qquad (28)$$

When $mr^2$ is substituted for I in Equation (28), an equation for mass can be obtained. However, the equation is complex and is not set out herein. Equations (25) and (28) can be used to calculate mass for the damped angular oscillator.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An active-spring linear-motion device for determining the mass of an object, comprising:

a platform for the object whose mass is to be determined, said platform being translatable in two directions along a single axis of motion and said platform having means for holding said object, and having a tare mass;

an actuator coupled between said platform and a fixed location along said axis of motion and operable to provide a variable force to said platform, said actuator being controllable such that it performs as an ideal spring;

a mechanism for moving said platform a definite displacement from its equilibrium position;

a latch mechanism operable to releasably latch said platform along said axis of motion at a distance from said equilibrium position;

a displacement sensor operable to measure instantaneous displacement of said platform during oscillations of said platform; and a processor programmed to direct said actuator to simulate certain adjustable spring characteristics, to determine the period of oscillation of said platform from values provided by said displacement sensor, and to calculate the mass of said object using values of said period of oscillation.

2. The device of claim 1, wherein said actuator is an electromagnetic actuator.

3. The device of claim 1, wherein said displacement sensor is a linear variable differential transformer.

4. The device of claim 1, wherein said displacement sensor comprises a velocity sensor and means for integrating the output of said velocity sensor.

5. The device of claim 1, wherein said processor is further programmed to control said latch mechanism and said actuator.

6. The device of claim 1, wherein said processor is further programmed to calculate said spring force from values of said instantaneous displacement, and to control said actuator in response to said calculations.

7. The device of claim 1, wherein said actuator further provides active damping and wherein said processor is further programmed to calculate spring forces and damping forces and to control said actuator so as to provide a resultant force to be applied to said platform.

8. The device of claim 1, further comprising means for moving said platform a certain displacement from its equilibrium position.

9. The device of claim 1, wherein said displacement sensor comprises an acceleration sensor and means for integrating the output of said acceleration sensor.

10. An active-spring linear-motion method of determining the mass of an object, comprising the steps of:

providing a platform capable of translatable motion in two directions along a single axis of motion, said platform being attached to an actuator which simulates a spring, and said platform having an equilibrium position and a tare mass;

attaching said object to said platform;

displacing said platform from said equilibrium position;

releasing said platform such that said platform is allowed to oscillate;

measuring displacement of said platform;

controlling said actuator such that said actuator applies a simulated spring force such that said platform oscillates along said axis of motion;

measuring the period of oscillation of said platform; and calculating said mass of said object from said period of oscillation, said tare mass, and said spring constant.

11. The method of claim 10, further comprising the step of using said actuator to apply a damping force to said platform to simulate damping.

12. A spring and active-damping linear-motion device for determining the mass of an object, comprising:

a platform for the object whose mass is to be determined, said platform being translatable in two directions along a single axis of motion and said platform having means for holding said object, and having a tare mass;

a mechanical spring coupled between said platform and a fixed location along said axis of motion and operable to provide a spring force to said platform;

an actuator operable to provide a damping force to said platform during oscillation of said platform;

a mechanism for translating said platform a definite displacement from said equilibrium position;

a latch mechanism operable to releasably latch said platform along said axis of motion at said displacement from an equilibrium position;

a velocity sensor operable to measure instantaneous velocity of said platform; and a processor which can direct said actuator to simulate certain adjustable damping characteristics and programmed to determine the said period of oscillation of said platform using values from a sensor and to calculate the mass of said object using said values of said period of oscillation.

13. The device of claim 12, wherein said velocity sensor is comprised of a displacement sensor and means for differentiating the output of said displacement sensor.

14. The device of claim 12, wherein said velocity sensor comprises an acceleration sensor and means for integrating the output of said acceleration sensor.

15. The device of claim 12, wherein said velocity sensor is a velocimeter.

16. The device of claim 12, further comprising means for activating said spring and wherein said processor controls said means for activating, thereby providing an active spring force.

17. An active-spring angular-motion device for determining the mass of an object, comprising:

a rotatable platform for holding the object whose mass is to be measured;

an actuator attached to said platform operable to provide a variable torque to said platform, said actuator being controllable such that it performs as an ideal torsional spring;

a mechanism for rotating said platform a definite angular displacement from its equilibrium position;

a latch mechanism operable to releasably latch said platform at said angular displacement from its equilibrium position;

a displacement sensor operable to measure instantaneous displacement of said platform during oscillations of said platform; and a processor programmed to direct said actuator to simulate certain adjustable torsion spring characteristics, to determine the period of said oscillation of said platform from values provided by said displacement sensor, and to calculate the mass of said object using said values of said period of oscillation.

18. The device of claim 17, wherein said actuator further provides active damping and wherein said processor is further programmed to control said actuator.

19. The device of claim 17, wherein said actuator is an electromagnetic actuator.

20. The device of claim 17, wherein said displacement sensor comprises a velocity sensor and means for integrating the output of said velocity sensor.

21. The device of claim 17, wherein said displacement sensor comprises an acceleration sensor and means for integrating the output of said acceleration sensor.

22. The device of claim 17, wherein said processor is further programmed to control said latch mechanism and said actuator.

23. The device of claim 17, wherein said processor is further programmed to calculate the spring force of said torsional spring from values of said instantaneous displacement, and to control said actuator in response to said calculations.

24. An active-spring angular-motion method of determining the mass of an object, comprising the steps of:

providing a rotatable platform, said platform being attached to an actuator which simulates a torsional spring, and said platform having an equilibrium position and a tare mass moment of inertia;

attaching said object whose mass is to be measured to said platform;

angularly displacing said platform from said equilibrium position;

releasing said platform such that said platform is allowed to oscillate;

measuring angular displacement of said platform;

controlling said actuator such that said actuator applies a restoring torque to said platform such that said platform oscillates;

measuring the period of angular oscillation of said platform; and calculating said mass of said object, using said period of angular oscillation, said tare mass moment of inertia, said spring constant, and radius of gyration of said object.

25. The method of claim 24, further comprising the step of adjusting said controller to direct said actuator to provide a certain torsional spring constant to simulate a torsional spring to said platform.

26. The method of claim 24, further comprising the step of controlling said actuator to simulate active damping of said spring.

27. An active-spring angular-motion method of determining the mass of an object, where the radius of gyration of said object is unknown, comprising the steps of:

placing an object whose mass is to be measured on said platform at a first radial displacement location from the center of rotation of said platform;

rotating said platform an angular displacement about an axis of rotation of said platform such that said platform is offset from an equilibrium position of said platform;

releasing said platform such that said platform is allowed to oscillate in response to a torque restoring actuator coupled to said platform;

controlling said actuator such that said actuator provides said restoring torque;

measuring the period of oscillation of said platform to obtain a first period of oscillation value;

placing said object at a second radial displacement location from the center of rotation of said platform;

repeating said rotating, releasing, controlling, and measuring steps, such that a second period of oscillation value is obtained;

calculating the mass of said object, using said first and said second period of oscillation values, said first and said second radial displacement values, tare mass moment of inertia of said platform at said first and said second radial displacement values, and simulated torsional spring constant.

28. The method of claim 27, further comprising the step of controlling said actuator such that said actuator applies an adjustable variable damping torque to said platform.

29. A spring and active-damping angular-motion device for determining the mass of an object, comprising:

a rotatable platform for holding the object whose mass is to be measured;

a torque restoring means attached to said platform such that when said platform is rotated about an axis of rotation of said platform from an equilibrium position, said torque restoring means provides a restoring torque to said platform;

an actuator operable to provide an adjustable, variable damping torque to said platform during oscillation of said platform;

a mechanism for rotating said platform a definite angular displacement from said equilibrium position;

a latch mechanism operable to releasably latch said platform at said angular displacement from equilibrium position;

a displacement sensor to measure instantaneous displacement of said platform during oscillations of said platform; and a processor which can direct said actuator to simulate certain adjustable damping characteristics and programmed to determine the said period of oscillation from a sensor and to calculate said mass of said object using values of said period of oscillation.

30. The device of claim 29, further comprising means for activating said spring and wherein said processor controls said means for activating, thereby providing an active spring force.

31. The device of claim 29, wherein said displacement sensor comprises a velocity sensor and means for integrating the output of said velocity sensor.

32. The device of claim 29, wherein said displacement sensor comprises an acceleration sensor and means for integrating the output of said acceleration sensor.

33. An active-spring and active-damping angular-motion method of determining the mass of an object, comprising the steps of:

providing a rotatable platform, said platform being attached to an actuator which simulates a torsional spring and damping, and said platform having an equilibrium position and a tare mass moment of inertia;

attaching an object whose mass is to be measured on said platform;

angularly displacing said platform from said equilibrium position;

releasing said platform such that said platform is allowed to oscillate;

measuring angular displacement and velocity of said platform;

controlling said actuator such that a torque is applied to said platform that includes simulations of a torsional spring and damping;

measuring the period of oscillation of said platform; and calculating said mass of said object, using said period of oscillation value, said tare mass moment of inertia of said platform at said first and said second radial displacement values, simulated torsional spring constant, and simulated damping constant.

* * * * *